(12) United States Patent
Macdall et al.

(10) Patent No.: US 11,143,409 B1
(45) Date of Patent: Oct. 12, 2021

(54) CAMPFIRE RACK

(71) Applicants: Nathan Macdall, Hooksett, NH (US); Jamie Cotnoir, Hooksett, NH (US)

(72) Inventors: Nathan Macdall, Hooksett, NH (US); Jamie Cotnoir, Hooksett, NH (US)

( * ) Notice: Subject to any disclaimer, the term of this patent is extended or adjusted under 35 U.S.C. 154(b) by 293 days.

(21) Appl. No.: 16/443,969

(22) Filed: Jun. 18, 2019

(51) Int. Cl.
*F23H 17/12* (2006.01)
*F24B 1/193* (2006.01)

(52) U.S. Cl.
CPC .................. *F24B 1/193* (2013.01)

(58) Field of Classification Search
CPC ....................................... F24B 1/195
USPC .............. 126/153, 25 R, 541, 542
See application file for complete search history.

(56) References Cited

U.S. PATENT DOCUMENTS

| | | | | |
|---|---|---|---|---|
| 4,305,375 | A * | 12/1981 | George | F23H 13/00 126/152 B |
| 4,411,251 | A | 10/1983 | Parton | |
| 5,435,295 | A | 7/1995 | Gerrard | |
| 5,722,390 | A * | 3/1998 | Hannebaum | F24B 1/193 126/152 B |
| 6,637,713 | B1 * | 10/2003 | Kleve | F24B 1/193 126/152 B |
| D697,192 | S | 1/2014 | Hills | |
| D707,342 | S | 6/2014 | Miller | |
| 9,357,875 | B1 | 6/2016 | Guiliano | |
| 9,532,679 | B1 | 1/2017 | Besch | |
| 2010/0326423 | A1 | 12/2010 | Dupont | |
| 2012/0156627 | A1 * | 6/2012 | Koch | F24B 1/193 431/2 |
| 2013/0306049 | A1 * | 11/2013 | Powers | F24B 13/008 126/152 B |
| 2014/0251306 | A1 * | 9/2014 | Byberg | F24B 1/193 126/542 |

FOREIGN PATENT DOCUMENTS

CA     2491169     6/2006

* cited by examiner

*Primary Examiner* — Avinash A Savani

(57) ABSTRACT

The campfire rack supports combustible fuel above a supporting surface. The campfire rack is an invertible structure. By invertible is meant that the orientation of the campfire rack relative to the supporting surface can be adjusted to accommodate fuel of different sizes and form factors. The campfire rack comprises a primary basin, a secondary basin, and a plurality of leg structures. The plurality of leg structures attach the primary basin to the secondary basin. The plurality of leg structures elevates the primary basin and the secondary basin above the supporting surface. In a primary orientation, the primary basin elevates the fuel above the supporting surface, and the plurality of leg structures contain the fuel on the primary basin. In an inverted orientation, the secondary basin elevates the fuel above the supporting surface, and the plurality of leg structures contain the fuel on the secondary basin.

16 Claims, 7 Drawing Sheets

CAMPFIRE RACK

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of lighting and heating including ranges, more specifically, a movable range adapted for travel. (F24B1/207)

SUMMARY OF INVENTION

The campfire rack is a mechanical structure. The campfire rack supports fuel consumed in a combustion reaction above a supporting surface. The campfire rack is an invertible structure. By invertible is meant that the orientation of the campfire rack relative to the supporting surface can be adjusted to accommodate fuel of different sizes and form factors. The campfire rack comprises a primary basin, a secondary basin, and a plurality of leg structures. The plurality of leg structures attach the primary basin to the secondary basin. The plurality of leg structures elevates the primary basin and the secondary basin above the supporting surface. In a primary orientation of the campfire rack, the primary basin elevates the fuel above the supporting surface, and the plurality of leg structures contain the fuel on the primary basin. In an inverted orientation of the campfire rack, the secondary basin elevates the fuel above the supporting surface, and the plurality of leg structures contain the fuel on the secondary basin.

These together with additional objects, features and advantages of the campfire rack will be readily apparent to those of ordinary skill in the art upon reading the following detailed description of the presently preferred, but nonetheless illustrative, embodiments when taken in conjunction with the accompanying drawings.

In this respect, before explaining the current embodiments of the campfire rack in detail, it is to be understood that the campfire rack is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the campfire rack.

It is therefore important that the claims be regarded as including such equivalent construction insofar as they do not depart from the spirit and scope of the campfire rack. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
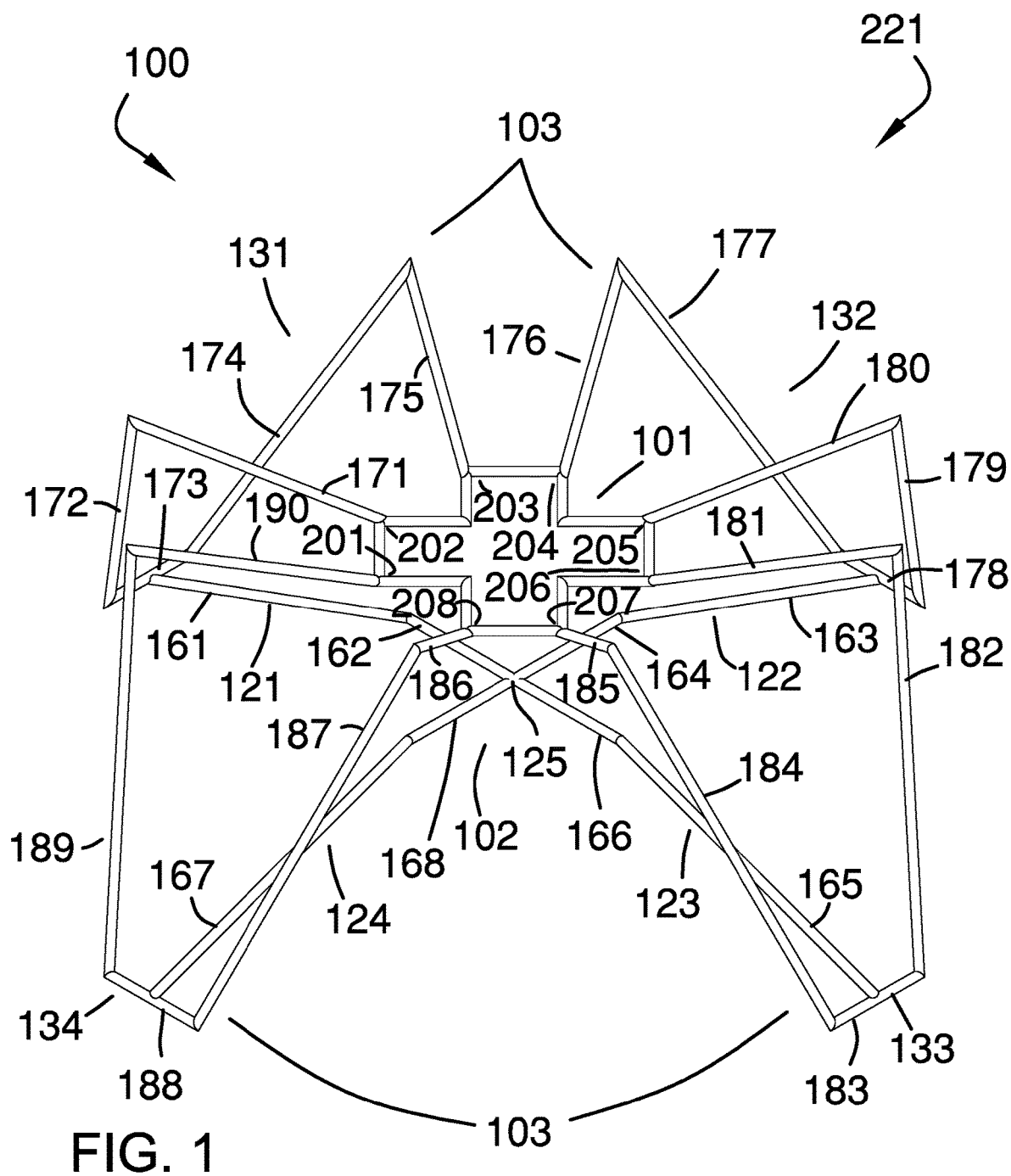
FIG. 1 is a perspective view of an embodiment of the disclosure.
Figure 2:
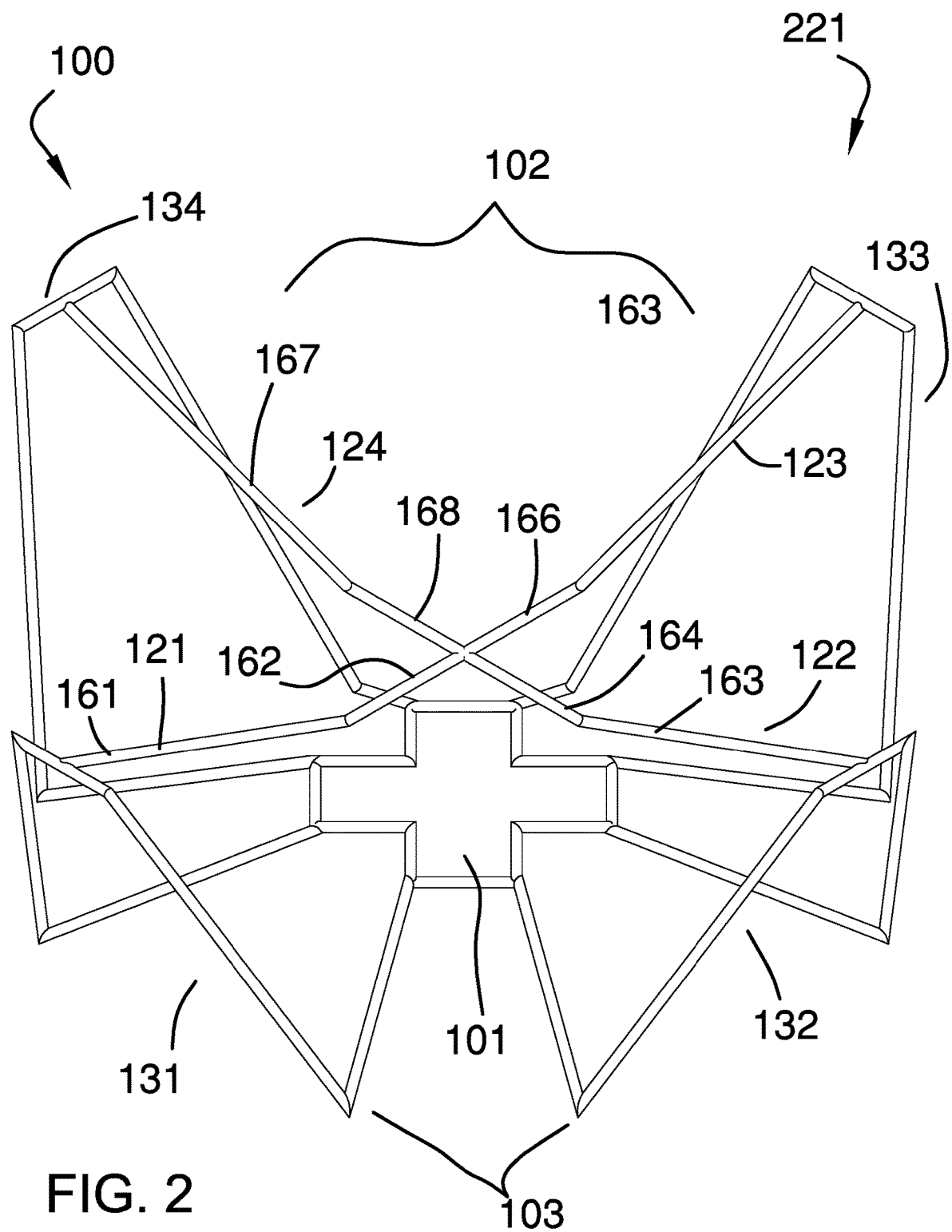
FIG. 2 is a reverse perspective view of an embodiment of the disclosure.
Figure 3:
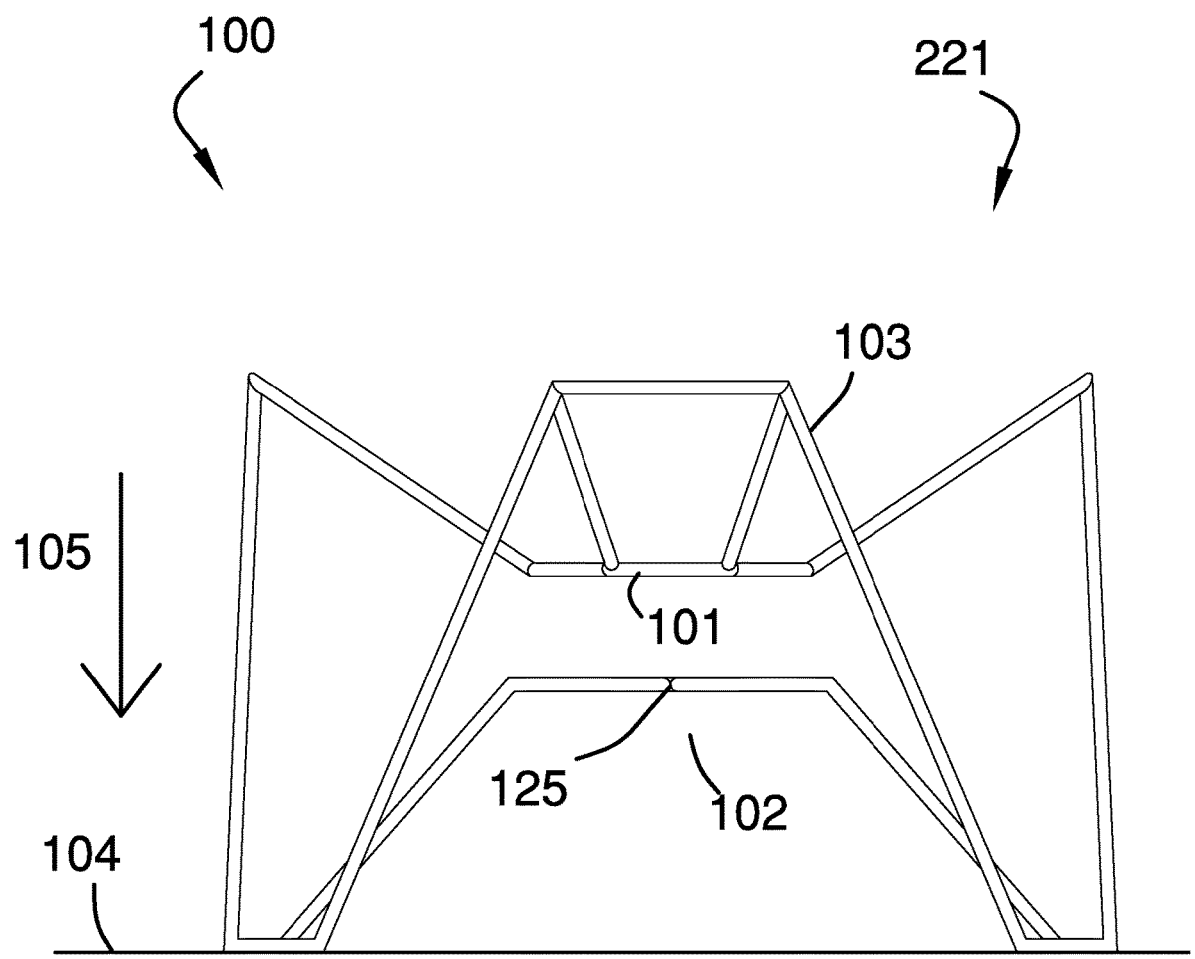
FIG. 3 is a front view of an embodiment of the disclosure.
Figure 4:
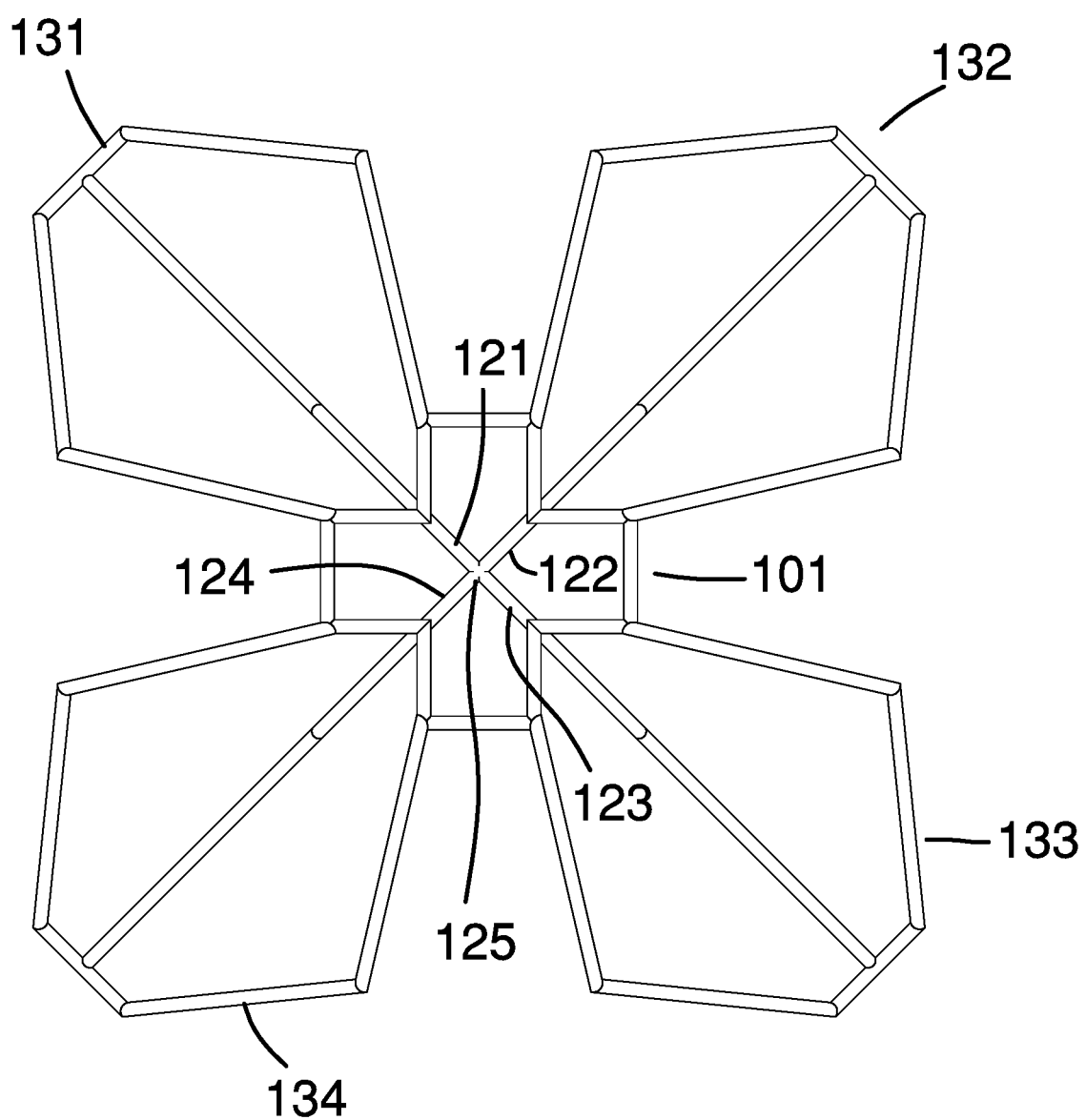
FIG. 4 is a top view of an embodiment of the disclosure.
Figure 5:
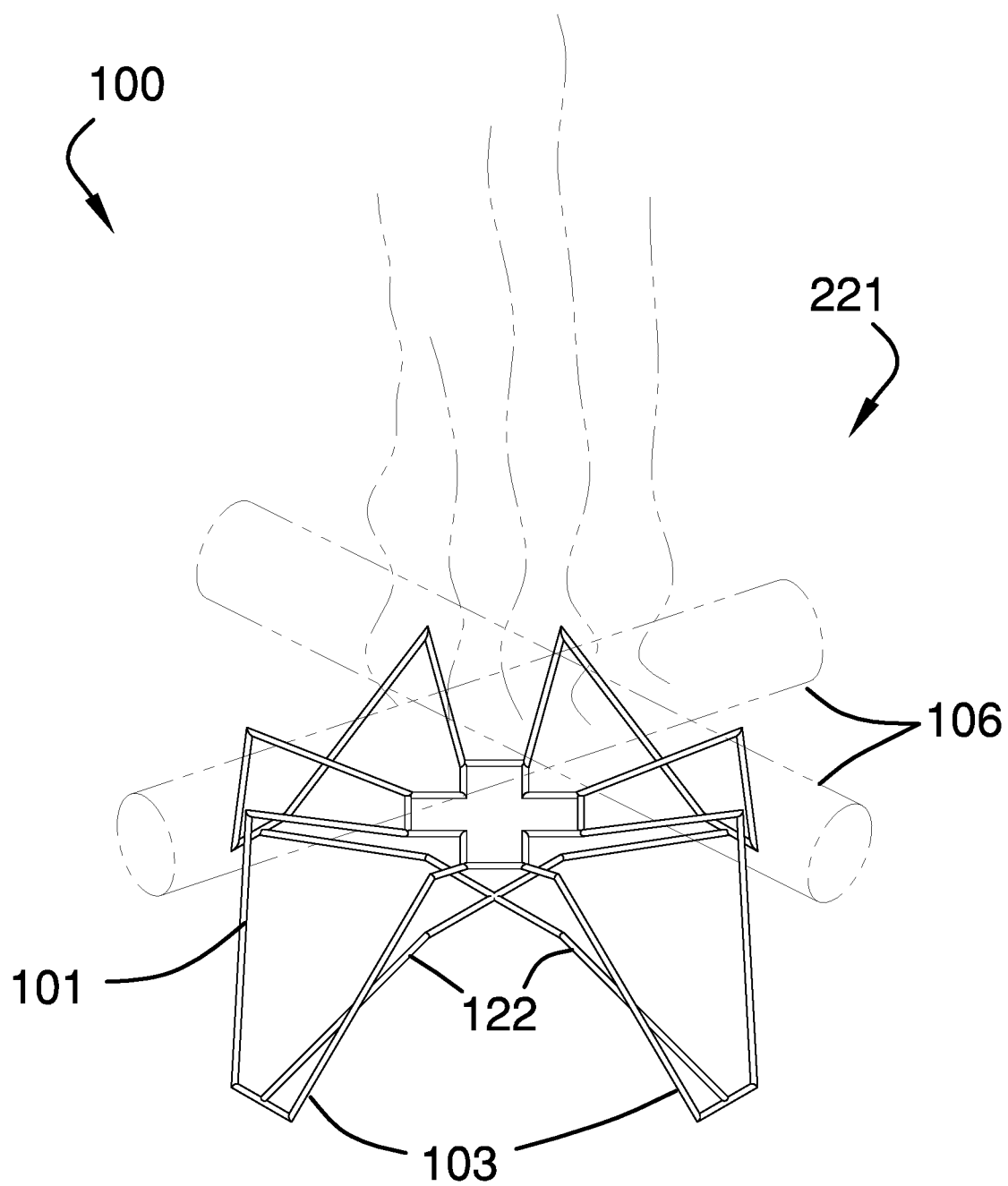
FIG. 5 is an in-use view of an embodiment of the disclosure.
Figure 6:
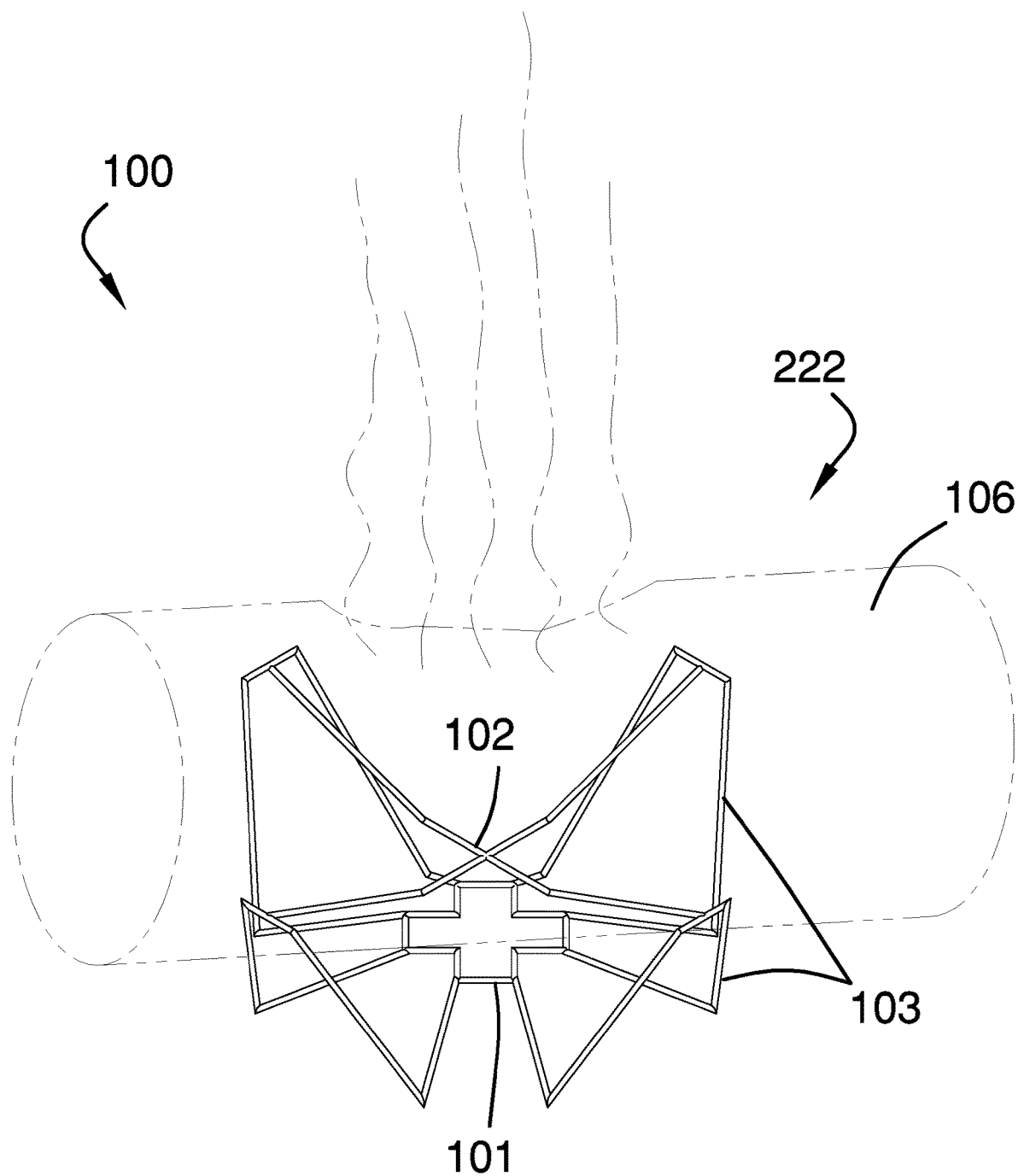
FIG. 6 is an in-use view of an embodiment of the disclosure.
Figure 7:
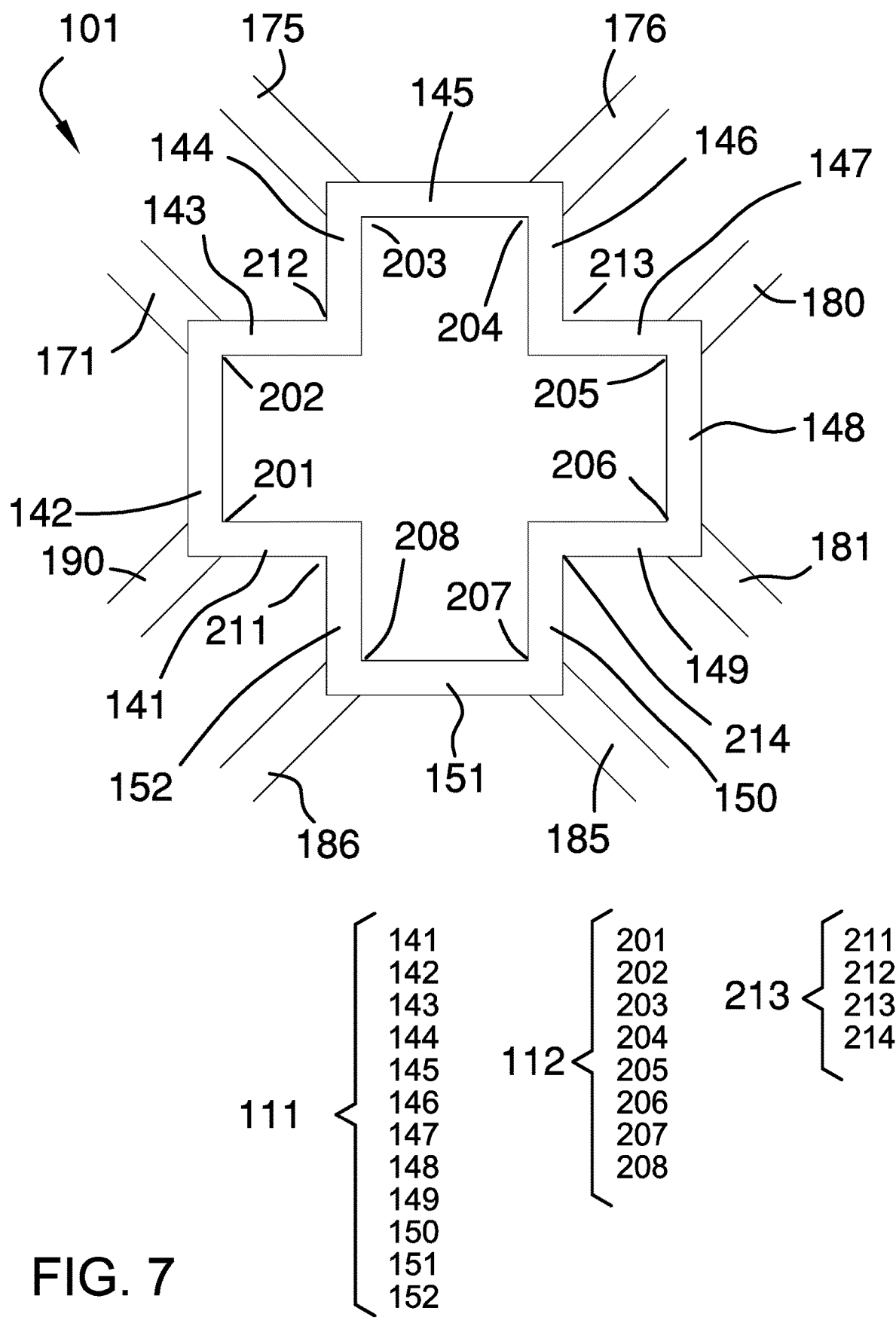
FIG. 7 is a detail view of an embodiment of the disclosure.

Detailed reference will now be made to one or more potential embodiments of the disclosure, which are illustrated in FIGS. 1 through 7.

The campfire rack 100 (hereinafter invention) is a mechanical structure. The invention 100 supports fuel 106 consumed in a combustion reaction above a supporting surface 104. The invention 100 comprises a primary basin 101, a secondary basin 102, and a plurality of leg structures 103. The plurality of leg structures 103 attach the primary basin 101 to the secondary basin 102. The plurality of leg structures 103 elevates the primary basin 101 and the secondary basin 102 above the supporting surface 104.

The invention 100 is an invertible structure. By invertible is meant that the orientation of the invention 100 relative to the supporting surface 104 can be adjusted to accommodate fuel 106 of different sizes and form factors. In a primary orientation 221 of the invention 100, the primary basin 101 elevates the fuel 106 above the supporting surface 104. The plurality of leg structures 103 contain the fuel 106 on the primary basin 101. In an inverted orientation 222 of the invention 100, the secondary basin 102 elevates the fuel 106 above the supporting surface 104. The plurality of leg structures 103 contain the fuel 106 on the secondary basin 102.

The supporting surface 104 is the surface on which the invention 100 rests during normal use. The supporting surface 104 is roughly perpendicular to the force of gravity 105. The supporting surface 104 is defined elsewhere in this disclosure. The force of gravity 105 is defined elsewhere in this disclosure. The fuel 106 is defined elsewhere in this disclosure.

Each of the plurality of leg structures 103 is a framework. Each of the plurality of leg structures 103 is an openwork structure. The plurality of leg structures 103 attach to the primary basin 101. The plurality of leg structures 103 attach to the secondary basin 102. The plurality of leg structures 103 forms the load path that transfers the load of the primary basin 101, the secondary basin 102, and the fuel 106 to the supporting surface 104. The plurality of leg structures 103 comprises a first leg structure 131, a second leg structure 132, a third leg structure 133, and a fourth leg structure 134.

The first leg structure 131 is a framework. The first leg structure 131 is an openwork structure. The first leg structure 131 forms a portion of the load path that transfers the loads of the primary basin 101 and the secondary basin 102 to the supporting surface 104. The first leg structure 131 comprises a first leg shaft 171, a second leg shaft 172, a third leg shaft 173, a fourth leg shaft 174, and a fifth leg shaft 175.

The first leg shaft 171 is a prism-shaped shaft. The first leg shaft 171 is a rigid structure. The second leg shaft 172 is a prism-shaped shaft. The second leg shaft 172 is a rigid structure. The third leg shaft 173 is a prism-shaped shaft. The third leg shaft 173 is a rigid structure. The fourth leg shaft 174 is a prism-shaped shaft. The fourth leg shaft 174 is a rigid structure. The fifth leg shaft 175 is a prism-shaped shaft. The fifth leg shaft 175 is a rigid structure.

The second leg structure 132 is a framework. The second leg structure 132 is an openwork structure. The second leg structure 132 forms a portion of the load path that transfers the loads of the primary basin 101 and the secondary basin 102 to the supporting surface 104. The second leg structure 132 comprises a sixth leg shaft 176, a seventh leg shaft 177, an eighth leg shaft 178, a ninth leg shaft 179, and a tenth leg shaft 180.

The sixth leg shaft 176 is a prism-shaped shaft. The sixth leg shaft 176 is a rigid structure. The seventh leg shaft 177 is a prism-shaped shaft. The seventh leg shaft 177 is a rigid structure. The eighth leg shaft 178 is a prism-shaped shaft. The eighth leg shaft 178 is a rigid structure. The ninth leg shaft 179 is a prism-shaped shaft. The ninth leg shaft 179 is a rigid structure. The tenth leg shaft 180 is a prism-shaped shaft. The tenth leg shaft 180 is a rigid structure.

The third leg structure 133 is a framework. The third leg structure 133 is an openwork structure. The third leg structure 133 forms a portion of the load path that transfers the loads of the primary basin 101 and the secondary basin 102 to the supporting surface 104. The third leg structure 133 comprises an eleventh leg shaft 181, a twelfth leg shaft 182, a thirteenth leg shaft 183, a fourteenth leg shaft 184, and a fifteenth leg shaft 185.

The eleventh leg shaft 181 is a prism-shaped shaft. The eleventh leg shaft 181 is a rigid structure. The twelfth leg shaft 182 is a prism-shaped shaft. The twelfth leg shaft 182 is a rigid structure. The thirteenth leg shaft 183 is a prism-shaped shaft. The thirteenth leg shaft 183 is a rigid structure. The fourteenth leg shaft 184 is a prism-shaped shaft. The fourteenth leg shaft 184 is a rigid structure. The fifteenth leg shaft 185 is a prism-shaped shaft. The fifteenth leg shaft 185 is a rigid structure.

The fourth leg structure 134 is a framework. The fourth leg structure 134 is an openwork structure. The fourth leg structure 134 forms a portion of the load path that transfers the loads of the primary basin 101 and the secondary basin 102 to the supporting surface 104. The fourth leg structure 134 comprises a sixteenth leg shaft 186, a seventeenth leg shaft 187, an eighteenth leg shaft 188, a nineteenth leg shaft 189, and a twentieth leg shaft 190.

The sixteenth leg shaft 186 is a prism-shaped shaft. The sixteenth leg shaft 186 is a rigid structure. The seventeenth leg shaft 187 is a prism-shaped shaft. The seventeenth leg shaft 187 is a rigid structure. The eighteenth leg shaft 188 is a prism-shaped shaft. The eighteenth leg shaft 188 is a rigid structure. The nineteenth leg shaft 189 is a prism-shaped shaft. The nineteenth leg shaft 189 is a rigid structure. The twentieth leg shaft 190 is a prism-shaped shaft. The twentieth leg shaft 190 is a rigid structure.

This paragraph describes the assembly of the first leg structure 131. The second leg shaft 172 attaches to the end of the first leg shaft 171 that is distal from the primary basin 101. The third leg shaft 173 attaches to the end of the second leg shaft 172 such that the third leg shaft 173 is horizontally oriented. The joint that attaches the second leg shaft 172 to the first leg shaft 171 such that the elevation of the brace point 125 of the secondary basin 102 is between the elevation of the primary basin 101 and the elevation of the center point of the third leg shaft 173. The fourth leg shaft 174 attaches to the end of the third leg shaft 173 such that the fourth leg shaft 174 projects away from the third leg shaft 173 in the same vertical direction as the second leg shaft 172. The fourth leg shaft 174 attaches to the end of the fifth leg shaft 175 that is distal from the primary basin 101.

This paragraph describes the assembly of the second leg structure 132. The seventh leg shaft 177 attaches to the end of the sixth leg shaft 176 that is distal from the primary basin 101. The eighth leg shaft 178 attaches to the end of the seventh leg shaft 177 such that the eighth leg shaft 178 is horizontally oriented. The joint that attaches the seventh leg shaft 177 to the sixth leg shaft 176 such that the elevation of the brace point 125 of the secondary basin 102 is between the elevation of the primary basin 101 and the elevation of the center point of the eighth leg shaft 178. The ninth leg shaft 179 attaches to the end of the eighth leg shaft 178 such that the ninth leg shaft 179 projects away from the eighth leg shaft 178 in the same vertical direction as the seventh leg shaft 177. The ninth leg shaft 179 attaches to the end of the tenth leg shaft 180 that is distal from the primary basin 101.

This paragraph describes the assembly of the third leg structure 133. The twelfth leg shaft 182 attaches to the end of the eleventh leg shaft 181 that is distal from the primary basin 101. The thirteenth leg shaft 183 attaches to the end of the twelfth leg shaft 182 such that the thirteenth leg shaft 183 is horizontally oriented. The joint that attaches the twelfth leg shaft 182 to the eleventh leg shaft 181 such that the elevation of the brace point 125 of the secondary basin 102 is between the elevation of the primary basin 101 and the elevation of the center point of the thirteenth leg shaft 183. The fourteenth leg shaft 184 attaches to the end of the thirteenth leg shaft 183 such that the fourteenth leg shaft 184 projects away from the thirteenth leg shaft 183 in the same vertical direction as the twelfth leg shaft 182. The fourteenth leg shaft 184 attaches to the end of the fifteenth leg shaft 185 that is distal from the primary basin 101.

This paragraph describes the assembly of the fourth leg structure 134. The seventeenth leg shaft 187 attaches to the end of the sixteenth leg shaft 186 that is distal from the primary basin 101. The eighteenth leg shaft 188 attaches to the end of the seventeenth leg shaft 187 such that the eighteenth leg shaft 188 is horizontally oriented. The joint that attaches the seventeenth leg shaft 187 to the sixteenth leg shaft 186 such that the elevation of the brace point 125 of the secondary basin 102 is between the elevation of the primary basin 101 and the elevation of the center point of the eighteenth leg shaft 188. The nineteenth leg shaft 189 attaches to the end of the eighteenth leg shaft 188 such that the nineteenth leg shaft 189 projects away from the eighteenth leg shaft 188 in the same vertical direction as the seventeenth leg shaft 187. The nineteenth leg shaft 189 attaches to the end of the twentieth leg shaft 190 that is distal from the primary basin 101.

The primary basin 101 is a horizontally oriented structure. The primary basin 101 has a cruciform shape. The primary basin 101 is a framework. The primary basin 101 is an openwork structure. The primary basin 101 braces the plurality of leg structures 103 for stability. The primary basin 101 supports the fuel 106 during combustion when the invention 100 is in the primary orientation 221. The primary basin 101 comprises a plurality of cruciform shafts 111, a plurality of interior right angles 112, and a plurality of exterior right angles 113.

Each of the plurality of cruciform shafts 111 is a prism-shaped shaft. The plurality of cruciform shafts 111 are interconnected to form the cruciform structure of the primary basin 101. The plurality of cruciform shafts 111 form the perimeter of the cruciform structure of the primary basin 101. The plurality of cruciform shafts 111 form a rectilinear structure. The plurality of cruciform shafts 111 elevates the fuel 106 when the invention 100 is in the primary orientation 221. The plurality of cruciform shafts 111 comprises a first cruciform shaft 141, a second cruciform shaft 142, a third cruciform shaft 143, a fourth cruciform shaft 144, a fifth cruciform shaft 145, a sixth cruciform shaft 146, a seventh cruciform shaft 147, an eighth cruciform shaft 148, a ninth cruciform shaft 149, a tenth cruciform shaft 150, an eleventh cruciform shaft 151, and a twelfth cruciform shaft 152.

The first cruciform shaft 141 is a prism-shaped shaft that attaches the twelfth cruciform shaft 152 to the second cruciform shaft 142. The first cruciform shaft 141 is a rigid structure. The second cruciform shaft 142 is a prism-shaped shaft that attaches the first cruciform shaft 141 to the third cruciform shaft 143. The second cruciform shaft 142 is a rigid structure. The third cruciform shaft 143 is a prism-shaped shaft that attaches the second cruciform shaft 142 to the fourth cruciform shaft 144. The third cruciform shaft 143 is a rigid structure. The fourth cruciform shaft 144 is a prism-shaped shaft that attaches the third cruciform shaft 143 to the fifth cruciform shaft 145. The fourth cruciform shaft 144 is a rigid structure. The fifth cruciform shaft 145 is a prism-shaped shaft that attaches the fourth cruciform shaft 144 to the sixth cruciform shaft 146. The fifth cruciform shaft 145 is a rigid structure.

The sixth cruciform shaft 146 is a prism-shaped shaft that attaches the fifth cruciform shaft 145 to the seventh cruciform shaft 147. The sixth cruciform shaft 146 is a rigid structure. The seventh cruciform shaft 147 is a prism-shaped shaft that attaches the sixth cruciform shaft 146 to the eighth cruciform shaft 148. The seventh cruciform shaft 147 is a rigid structure. The eighth cruciform shaft 148 is a prism-shaped shaft that attaches the seventh cruciform shaft 147 to the ninth cruciform shaft 149. The eighth cruciform shaft 148 is a rigid structure.

The ninth cruciform shaft 149 is a prism-shaped shaft that attaches the eighth cruciform shaft 148 to the tenth cruciform shaft 150. The ninth cruciform shaft 149 is a rigid structure. The tenth cruciform shaft 150 is a prism-shaped shaft that attaches the ninth cruciform shaft 149 to the eleventh cruciform shaft 151. The tenth cruciform shaft 150 is a rigid structure. The eleventh cruciform shaft 151 is a prism-shaped shaft that attaches the tenth cruciform shaft 150 to the twelfth cruciform shaft 152. The eleventh cruciform shaft 151 is a rigid structure. The twelfth cruciform shaft 152 is a prism-shaped shaft that attaches the eleventh cruciform shaft 151 to the first cruciform shaft 141. The twelfth cruciform shaft 152 is a rigid structure.

Each of the plurality of interior right angles 112 is an interior angle when viewed from within the perimeter formed by the plurality of cruciform shafts 111 that creates the primary basin 101. Each of the plurality of interior right angles 112 is an interior right angle. Each of the plurality of interior right angles 112 is formed by joining two adjacent cruciform shafts selected from the plurality of cruciform shafts 111. The plurality of interior right angles 112 comprises a first interior right angle 201, a second interior right angle 202, a third interior right angle 203, a fourth interior right angle 204, a fifth interior right angle 205, a sixth interior right angle 206, a seventh interior right angle 207, and an eighth interior right angle 208.

Each of the plurality of exterior right angles 113 is an exterior angle when viewed from within the perimeter formed by the plurality of cruciform shafts 111 that creates the primary basin 101. Each of the plurality of exterior right angles 113 is an exterior right angle. Each of the plurality of exterior right angles 113 is formed by joining two adjacent cruciform shafts selected from the plurality of cruciform shafts 111. The plurality of exterior right angles 113 comprises a first exterior right angle 211, a second exterior right angle 212, a third exterior right angle 213, and a fourth exterior right angle 214.

The first cruciform shaft 141 attaches to the second cruciform shaft 142 to form a right interior angle called the first interior right angle 201. The second cruciform shaft 142 attaches to the third cruciform shaft 143 to form a right interior angle called the second interior right angle 202. The third cruciform shaft 143 attaches to the fourth cruciform shaft to form a right exterior angle called the second exterior right angle 212. The fourth cruciform shaft 144 attaches to the fifth cruciform shaft 145 to form a right interior angle called the third interior right angle 203. The fifth cruciform shaft 145 attaches to the sixth cruciform shaft 146 to form a right interior angle called the fourth interior right angle 204. The sixth cruciform shaft 146 attaches to the seventh cruciform shaft 147 to form a right exterior angle called the third exterior right angle 213.

The seventh cruciform shaft 147 attaches to the eighth cruciform shaft 148 to form a right interior angle called the fifth interior right angle 205. The eighth cruciform shaft 148 attaches to the ninth cruciform shaft 149 to form a right interior angle called the sixth interior right angle 206. The ninth cruciform shaft 149 attaches to the tenth cruciform shaft 150 to form a right exterior angle called the fourth exterior right angle 214. The tenth cruciform shaft 150 attaches to the eleventh cruciform shaft 151 to form a right interior angle called the seventh interior right angle 207. The eleventh cruciform shaft 151 attaches to the twelfth cruciform shaft 152 to form a right interior angle called the eighth interior right angle 208. The twelfth cruciform shaft 152 attaches to the first cruciform shaft 141 to form a right exterior angle called the first exterior right angle 211.

The first cruciform shaft 141, the second cruciform shaft 142, the third cruciform shaft 143, the fourth cruciform shaft 144, the fifth cruciform shaft 145, the sixth cruciform shaft 146, the seventh cruciform shaft 147, the eighth cruciform shaft 148, the ninth cruciform shaft 149, the tenth cruciform shaft 150, the eleventh cruciform shaft 151, and the twelfth cruciform shaft 152 are assembled to form a planar cruciform structure.

The first leg shaft 171 of the first leg structure 131 attaches to the second interior right angle 202 of the primary basin 101 such that the first leg shaft 171 projects away from the secondary basin 102 such that the elevation of the primary basin 101 is between the elevation of the center point of the first leg shaft 171 and the elevation of the brace point 125 of the secondary basin 102.

The fifth leg shaft 175 of the first leg structure 131 attaches to the third interior right angle 203 of the primary basin 101 such that the fifth leg shaft 175 projects away from the secondary basin 102 such that the elevation of the primary basin 101 is between the elevation of the center point of the fifth leg shaft 175 and the elevation of the brace point 125 of the secondary basin 102.

The sixth leg shaft 176 of the second leg structure 132 attaches to the fourth interior right angle 204 of the primary basin 101 such that the sixth leg shaft 176 projects away from the secondary basin 102 such that the elevation of the primary basin 101 is between the elevation of the center point of the sixth leg shaft 176 and the elevation of the brace point 125 of the secondary basin 102.

The tenth leg shaft 180 of the second leg structure 132 attaches to the fifth interior right angle 205 of the primary basin 101 such that the tenth leg shaft 180 projects away from the secondary basin 102 such that the elevation of the primary basin 101 is between the elevation of the center point of the tenth leg shaft 180 and the elevation of the brace point 125 of the secondary basin 102.

The eleventh leg shaft 181 of the third leg structure 133 attaches to the sixth interior right angle 206 of the primary basin 101 such that the eleventh leg shaft 181 projects away from the secondary basin 102 such that the elevation of the primary basin 101 is between the elevation of the center point of the eleventh leg shaft 181 and the elevation of the brace point 125 of the secondary basin 102.

The fifteenth leg shaft 185 of the third leg structure 133 attaches to the seventh interior right angle 207 of the primary basin 101 such that the fifteenth leg shaft 185 projects away from the secondary basin 102 such that the elevation of the primary basin 101 is between the elevation of the center point of the fifteenth leg shaft 185 and the elevation of the brace point 125 of the secondary basin 102.

The sixteenth leg shaft 186 of the fourth leg structure 134 attaches to the eighth interior right angle 208 of the primary basin 101 such that the sixteenth leg shaft 186 projects away from the secondary basin 102 such that the elevation of the primary basin 101 is between the elevation of the center point of the sixteenth leg shaft 186 and the elevation of the brace point 125 of the secondary basin 102.

The twentieth leg shaft 190 of the fourth leg structure 134 attaches to the first interior right angle 201 of the primary basin 101 such that the twentieth leg shaft 190 projects away from the secondary basin 102 such that the elevation of the primary basin 101 is between the elevation of the center point of the twentieth leg shaft 190 and the elevation of the brace point 125 of the secondary basin 102.

The secondary basin 102 is a horizontally oriented structure. The secondary basin 102 has a cross shape. The secondary basin 102 is a framework. The secondary basin 102 is an openwork structure. The secondary basin 102 braces the plurality of leg structures 103 for stability. The secondary basin 102 supports the fuel 106 during combustion when the invention 100 is in the inverted orientation 222. The secondary basin 102 comprises a first brace structure 121, a second brace structure 122, a third brace structure 123, a fourth brace structure 124, and a brace point 125. The first brace structure 121, the second brace structure 122, the third brace structure 123, and the fourth brace structure 124 join together to form the brace point 125.

The brace point 125 is a joint that attaches the first brace structure 121, the second brace structure 122, the third brace structure 123, and the fourth brace structure 124 to each other.

The first brace structure 121 is a non-Euclidean composite prism. The first brace structure 121 is formed with a cant. The first brace structure 121 is a brace that reinforces the structural stability of the plurality of leg structures 103. The first brace structure 121 elevates the fuel 106 when the invention 100 is in the inverted orientation 222. The first brace structure 121 comprises a first brace shaft 161, and a second brace shaft 162. The first brace shaft 161 is a prism-shaped shaft. The first brace shaft 161 is a rigid structure. The second brace shaft 162 is a prism-shaped shaft. The second brace shaft 162 is a rigid structure.

The second brace structure 122 is a non-Euclidean composite prism. The second brace structure 122 is formed with a cant. The second brace structure 122 is a brace that reinforces the structural stability of the plurality of leg structures 103. The second brace structure 122 elevates the fuel 106 when the invention 100 is in the inverted orientation 222. The second brace structure 122 comprises a third brace shaft 163, and a fourth brace shaft 164. The third brace shaft 163 is a prism-shaped shaft. The third brace shaft 163 is a rigid structure. The fourth brace shaft 164 is a prism-shaped shaft. The fourth brace shaft 164 is a rigid structure.

The third brace structure 123 is a non-Euclidean composite prism. The third brace structure 123 is formed with a cant. The third brace structure 123 is a brace that reinforces the structural stability of the plurality of leg structures 103. The third brace structure 123 elevates the fuel 106 when the invention 100 is in the inverted orientation 222. The third brace structure 123 comprises a fifth brace shaft 165, and a sixth brace shaft 166. The fifth brace shaft 165 is a prism-shaped shaft. The fifth brace shaft 165 is a rigid structure. The sixth brace shaft 166 is a prism-shaped shaft. The sixth brace shaft 166 is a rigid structure.

The fourth brace structure 124 is a non-Euclidean composite prism. The fourth brace structure 124 is formed with a cant. The fourth brace structure 124 is a brace that reinforces the structural stability of the plurality of leg structures 103. The fourth brace structure 124 elevates the fuel 106 when the invention 100 is in the inverted orientation 222. The fourth brace structure 124 comprises a seventh brace shaft 167, and an eighth brace shaft 168. The seventh brace shaft 167 is a prism-shaped shaft. The seventh brace shaft 167 is a rigid structure. The eighth brace shaft 168 is a prism-shaped shaft. The eighth brace shaft 168 is a rigid structure.

The following four paragraphs describe the assembly and attachments of the secondary basin 102.

The first brace shaft 161 and the second brace shaft 162 combine to form the first brace structure 121. The first brace structure 121 attaches the third leg shaft 173 to the brace point 125 of the plurality of leg structures 103. An end of the first brace shaft 161 attaches to the third leg shaft 173 at the center point of the center axis of the third leg shaft 173. The end of the first brace shaft 161 that is distal from the third leg shaft 173 attaches to the end of the second brace shaft 162 that is distal from the brace point 125 of the plurality of leg structures 103. The end of the second brace shaft 162 that is distal from the first brace shaft 161 attaches to the brace point 125 of the plurality of leg structures 103.

The third brace shaft 163 and the fourth brace shaft 164 combine to form the second brace structure 122. The second brace structure 122 attaches the eighth leg shaft 178 to the brace point 125 of the plurality of leg structures 103. An end of the third brace shaft 163 attaches to the eighth leg shaft 178 at the center point of the center axis of the eighth leg shaft 178. The end of the third brace shaft 163 that is distal from the eighth leg shaft 178 attaches to the end of the fourth brace shaft 164 that is distal from the brace point 125 of the plurality of leg structures 103. The end of the fourth brace shaft 164 that is distal from the third brace shaft 163 attaches to the brace point 125 of the plurality of leg structures 103.

The fifth brace shaft 165 and the sixth brace shaft 166 combine to form the third brace structure 123. The third brace structure 123 attaches the thirteenth leg shaft 183 to the brace point 125 of the plurality of leg structures 103. An end of the fifth brace shaft 165 attaches to the thirteenth leg shaft 183 at the center point of the center axis of the thirteenth leg shaft 183. The end of the fifth brace shaft 165 that is distal from the thirteenth leg shaft 183 attaches to the end of the sixth brace shaft 166 that is distal from the brace point 125 of the plurality of leg structures 103. The end of the sixth brace shaft 166 that is distal from the fifth brace shaft 165 attaches to the brace point 125 of the plurality of leg structures 103.

The seventh brace shaft 167 and the eighth brace shaft 168 combine to form the fourth brace structure 124. The fourth brace structure 124 attaches the eighteenth leg shaft 188 to the brace point 125 of the plurality of leg structures 103. An end of the seventh brace shaft 167 attaches to the eighteenth leg shaft 188 at the center point of the center axis of the eighteenth leg shaft 188. The end of the seventh brace shaft 167 that is distal from the eighteenth leg shaft 188 attaches to the end of the eighth brace shaft 168 that is distal from the brace point 125 of the plurality of leg structures 103. The end of the eighth brace shaft 168 that is distal from the seventh brace shaft 167 attaches to the brace point 125 of the plurality of leg structures 103.

To use the invention 100 in the primary orientation 221, the third leg shaft 173, the eighth leg shaft 178, the thirteenth leg shaft 183, and the eighteenth leg shaft 188 are placed on the supporting surface 104. In the primary orientation 221, the primary basin 101 is in a position superior to the secondary basin 102 and the fuel 106 rests on the superior surface of the primary basin 101 during combustion.

To use the invention 100 in the inverted orientation 222, the joints formed by the: a) first leg shaft 171 and the second leg shaft 172; b) the fourth leg shaft 174 and the fifth leg shaft 175; c) the sixth leg shaft 176 and the seventh leg shaft 177; d) the ninth leg shaft 179 and the tenth leg shaft 180; e) the eleventh leg shaft 181 and the twelfth leg shaft 182; f) the fourteenth leg shaft 184 and the fifteenth leg shaft 185; g) the sixteenth leg shaft 186 and the seventeenth leg shaft 187; and, h) the nineteenth leg shaft 189 and the twentieth leg shaft 190 rest on the supporting surface 104. In the inverted orientation 222, the secondary basin 102 is in a position superior to the primary basin 101 and the fuel 106 rests on the superior surface of the secondary basin 102 during combustion.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Angle: As used in this disclosure, an angle is a measure of a region between two intersecting lines or surfaces.

Angle, Exterior: As used in this disclosure, an exterior angle is a cant that is formed in the perimeter of area wherein the angle of lesser arc is formed by the cant facing the exterior of the bounded area.

Angle, Interior: As used in this disclosure, an interior angle is a cant that is formed in the perimeter of area wherein the angle of lesser arc is formed by the cant facing the interior of the bounded area.

Arc: As used in this disclosure, an arc refers to a portion of a circumference or a curved perimeter. When applied to an angle, the arc also refers to a measure of an angular span as measured from a circle at the vertex formed by the sides of the angle.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Combustion: As used in this disclosure, combustion refers to a reduction-oxidation reaction wherein oxygen and a hydrocarbon are combined to release energy, carbon dioxide, and water. In general usage, the meaning of combustion is often extended to describe a reaction between oxygen and a fuel source, such as a hydrocarbon modified by functional groups, which releases energy.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Cruciform: As used in this disclosure, a cruciform is a structure that has a cross shape. A right cruciform refers to a cross shape forming right angles.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Frame: As used in this disclosure, a frame is a structure: a) to which an object attaches; and, b) which forms a portion of the load path of the object.

Framework: As used in this disclosure, a framework refers to the substructure of an object that carries the load path of the object.

Fuel: As used in this disclosure, fuel refers to a substance that undergoes a chemical combustion reaction to release chemical potential energy.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Non-Euclidean Prism: As used in this disclosure, a non-Euclidean prism is a prism structure wherein the center axis of the prism lies on a non-Euclidean plane.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Openwork: As used in this disclosure, the term open work is used to describe a structure, often a surface, which is formed with one or more openings that allow for visibility and fluid flow through the structure. Wrought work and meshes are forms of openwork.

Orientation: As used in this disclosure, orientation refers to the positioning of a first object relative to: 1) a second object; or, 2) a fixed position, location, or direction.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Reduction-Oxidation Reaction: As used in this disclosure, a reduction-oxidation reaction (also known as a redox reaction) is a chemical reaction involving the transfer of electrons between the reactants of the reaction.

Rigid Structure: As used in this disclosure, a rigid structure is a solid structure formed from an inelastic material that resists changes in shape. A rigid structure will permanently deform as it fails under a force.

Roughly: As used in this disclosure, roughly refers to a comparison between two objects. Roughly means that the difference between one or more parameters of the two compared are not significantly different.

Shaft: As used in this disclosure, a shaft is a long, narrow and rigid prism structure that is used as: 1) a structural element of a larger object; or 2) as a grip or lever for a handle. Shafts often have a cylindrical shape.

Superior: As used in this disclosure, the term superior refers to a directional reference that is parallel to and in the opposite direction of the force of gravity when an object is positioned or used normally.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A campfire rack comprising
a primary basin, a secondary basin, and a plurality of leg structures;
wherein the plurality of leg structures attach the primary basin to the secondary basin;
wherein the campfire rack is a mechanical structure;
wherein the campfire rack supports fuel consumed in a combustion reaction above a supporting surface;
wherein the plurality of leg structures elevates the primary basin and the secondary basin above the supporting surface;
wherein the campfire rack is an invertible structure;
wherein by invertible is meant that the orientation of the campfire rack relative to the supporting surface is adjustable;
wherein in a primary orientation of the campfire rack the primary basin elevates the fuel above the supporting surface;
wherein in an inverted orientation of the campfire rack, the secondary basin elevates the fuel above the supporting surface;
wherein the plurality of leg structures contain the fuel on the primary basin;
wherein the plurality of leg structures contain the fuel on the secondary basin;
wherein each of the plurality of leg structures is a framework;
wherein each of the plurality of leg structures is an openwork structure;
wherein the plurality of leg structures attach to the primary basin;
wherein the plurality of leg structures attach to the secondary basin;
wherein the plurality of leg structures forms the load path that transfers the load of the primary basin, the secondary basin, and the fuel to the supporting surface;
wherein the primary basin is a horizontally oriented structure;
wherein the primary basin has a cruciform shape;
wherein the primary basin is a framework;
wherein the primary basin is an openwork structure;
wherein the primary basin braces the plurality of leg structures for stability;
wherein the primary basin supports the fuel during combustion when the campfire rack is in the primary orientation.

2. The campfire rack according to claim 1
wherein the secondary basin is a horizontally oriented structure;
wherein the secondary basin has a cross shape;
wherein the secondary basin is a framework;
wherein the secondary basin is an openwork structure;
wherein the secondary basin braces the plurality of leg structures for stability;
wherein the secondary basin supports the fuel during combustion when the campfire rack is in the inverted orientation.

3. The campfire rack according to claim 2
wherein the plurality of leg structures comprises a first leg structure, a second leg structure, a third leg structure, and a fourth leg structure;
wherein the first leg structure is a framework;
wherein the first leg structure is an openwork structure;
wherein the first leg structure forms a portion of the load path that transfers the loads of the primary basin and the secondary basin to the supporting surface;
wherein the second leg structure is a framework;
wherein the second leg structure is an openwork structure;
wherein the second leg structure forms a portion of the load path that transfers the loads of the primary basin and the secondary basin to the supporting surface;
wherein the third leg structure is a framework;
wherein the third leg structure is an openwork structure;
wherein the third leg structure forms a portion of the load path that transfers the loads of the primary basin and the secondary basin to the supporting surface;
wherein the fourth leg structure is a framework;
wherein the fourth leg structure is an openwork structure;
wherein the fourth leg structure forms a portion of the load path that transfers the loads of the primary basin and the secondary basin to the supporting surface.

4. The campfire rack according to claim 3
wherein the first leg structure comprises a first leg shaft, a second leg shaft, a third leg shaft, a fourth leg shaft, and a fifth leg shaft;
wherein the first leg shaft is a prism-shaped shaft;
wherein the first leg shaft is a rigid structure;
wherein the second leg shaft is a prism-shaped shaft;
wherein the second leg shaft is a rigid structure;
wherein the third leg shaft is a prism-shaped shaft;
wherein the third leg shaft is a rigid structure;
wherein the fourth leg shaft is a prism-shaped shaft;
wherein the fourth leg shaft is a rigid structure;
wherein the fifth leg shaft is a prism-shaped shaft;
wherein the fifth leg shaft is a rigid structure;

wherein the second leg structure comprises a sixth leg shaft, a seventh leg shaft, an eighth leg shaft, a ninth leg shaft, and a tenth leg shaft;

wherein the sixth leg shaft is a prism-shaped shaft;

wherein the sixth leg shaft is a rigid structure;

wherein the seventh leg shaft is a prism-shaped shaft;

wherein the seventh leg shaft is a rigid structure;

wherein the eighth leg shaft is a prism-shaped shaft;

wherein the eighth leg shaft is a rigid structure;

wherein the ninth leg shaft is a prism-shaped shaft;

wherein the ninth leg shaft is a rigid structure;

wherein the tenth leg shaft is a prism-shaped shaft;

wherein the tenth leg shaft is a rigid structure;

wherein the third leg structure comprises an eleventh leg shaft, a twelfth leg shaft, a thirteenth leg shaft, a fourteenth leg shaft, and a fifteenth leg shaft;

wherein the eleventh leg shaft is a prism-shaped shaft;

wherein the eleventh leg shaft is a rigid structure;

wherein the twelfth leg shaft is a prism-shaped shaft;

wherein the twelfth leg shaft is a rigid structure;

wherein the thirteenth leg shaft is a prism-shaped shaft;

wherein the thirteenth leg shaft is a rigid structure;

wherein the fourteenth leg shaft is a prism-shaped shaft;

wherein the fourteenth leg shaft is a rigid structure;

wherein the fifteenth leg shaft is a prism-shaped shaft;

wherein the fifteenth leg shaft is a rigid structure;

wherein the fourth leg structure comprises a sixteenth leg shaft, a seventeenth leg shaft, an eighteenth leg shaft, a nineteenth leg shaft, and a twentieth leg shaft;

wherein the sixteenth leg shaft is a prism-shaped shaft;

wherein the sixteenth leg shaft is a rigid structure;

wherein the seventeenth leg shaft is a prism-shaped shaft;

wherein the seventeenth leg shaft is a rigid structure;

wherein the eighteenth leg shaft is a prism-shaped shaft;

wherein the eighteenth leg shaft is a rigid structure;

wherein the nineteenth leg shaft is a prism-shaped shaft;

wherein the nineteenth leg shaft is a rigid structure;

wherein the twentieth leg shaft is a prism-shaped shaft;

wherein the twentieth leg shaft is a rigid structure.

5. The campfire rack according to claim 4 wherein the second leg shaft attaches to the end of the first leg shaft that is distal from the primary basin;

wherein the third leg shaft attaches to the end of the second leg shaft such that the third leg shaft is horizontally oriented;

wherein the fourth leg shaft attaches to the end of the third leg shaft such that the fourth leg shaft projects away from the third leg shaft in the same vertical direction as the second leg shaft;

wherein the fourth leg shaft attaches to the end of the fifth leg shaft that is distal from the primary basin;

wherein this paragraph describes the assembly of the second leg structure;

wherein the seventh leg shaft attaches to the end of the sixth leg shaft that is distal from the primary basin;

wherein the eighth leg shaft attaches to the end of the seventh leg shaft such that the eighth leg shaft is horizontally oriented;

wherein the ninth leg shaft attaches to the end of the eighth leg shaft such that the ninth leg shaft projects away from the eighth leg shaft in the same vertical direction as the seventh leg shaft;

wherein the ninth leg shaft attaches to the end of the tenth leg shaft that is distal from the primary basin;

wherein this paragraph describes the assembly of the third leg structure;

wherein the twelfth leg shaft attaches to the end of the eleventh leg shaft that is distal from the primary basin;

wherein the thirteenth leg shaft attaches to the end of the twelfth leg shaft such that the thirteenth leg shaft is horizontally oriented;

wherein the fourteenth leg shaft attaches to the end of the thirteenth leg shaft such that the fourteenth leg shaft projects away from the thirteenth leg shaft in the same vertical direction as the twelfth leg shaft;

wherein the fourteenth leg shaft attaches to the end of the fifteenth leg shaft that is distal from the primary basin;

wherein this paragraph describes the assembly of the fourth leg structure;

wherein the seventeenth leg shaft attaches to the end of the sixteenth leg shaft that is distal from the primary basin;

wherein the eighteenth leg shaft attaches to the end of the seventeenth leg shaft such that the eighteenth leg shaft is horizontally oriented;

wherein the nineteenth leg shaft attaches to the end of the eighteenth leg shaft such that the nineteenth leg shaft projects away from the eighteenth leg shaft in the same vertical direction as the seventeenth leg shaft;

wherein the nineteenth leg shaft attaches to the end of the twentieth leg shaft that is distal from the primary basin.

6. The campfire rack according to claim 5 wherein the joint that attaches the second leg shaft to the first leg shaft such that the elevation of the brace point of the secondary basin is between the elevation of the primary basin and the elevation of the center point of the third leg shaft;

wherein the joint that attaches the seventh leg shaft to the sixth leg shaft such that the elevation of the brace point of the secondary basin is between the elevation of the primary basin and the elevation of the center point of the eighth leg shaft;

wherein the joint that attaches the twelfth leg shaft to the eleventh leg shaft such that the elevation of the brace point of the secondary basin is between the elevation of the primary basin and the elevation of the center point of the thirteenth leg shaft;

wherein the joint that attaches the seventeenth leg shaft to the sixteenth leg shaft such that the elevation of the brace point of the secondary basin is between the elevation of the primary basin and the elevation of the center point of the eighteenth leg shaft.

7. The campfire rack according to claim 6 wherein the primary basin comprises a plurality of cruciform shafts, a plurality of interior right angles, and a plurality of exterior right angles;

wherein each of the plurality of cruciform shafts is a prism-shaped shaft;

wherein the plurality of cruciform shafts are interconnected to form the cruciform structure of the primary basin;

wherein the plurality of cruciform shafts form the perimeter of the cruciform structure of the primary basin;

wherein the plurality of cruciform shafts form a rectilinear structure;

wherein the plurality of cruciform shafts elevates the fuel when the campfire rack is in the primary orientation;

wherein each of the plurality of interior right angles is an interior angle when viewed from within the perimeter formed by the plurality of cruciform shafts that creates the primary basin;

wherein each of the plurality of interior right angles is an interior right angle;

wherein each of the plurality of interior right angles is formed by joining two adjacent cruciform shafts selected from the plurality of cruciform shafts;
wherein each of the plurality of exterior right angles is an exterior angle when viewed from within the perimeter formed by the plurality of cruciform shafts that creates the primary basin;
wherein each of the plurality of exterior right angles is an exterior right angle;
wherein each of the plurality of exterior right angles is formed by joining two adjacent cruciform shafts selected from the plurality of cruciform shafts.

8. The campfire rack according to claim 7
wherein the plurality of cruciform shafts comprises a first cruciform shaft, a second cruciform shaft, a third cruciform shaft, a fourth cruciform shaft, a fifth cruciform shaft, a sixth cruciform shaft, a seventh cruciform shaft, an eighth cruciform shaft, a ninth cruciform shaft, a tenth cruciform shaft, an eleventh cruciform shaft, and a twelfth cruciform shaft;
wherein the first cruciform shaft is a prism-shaped shaft that attaches the twelfth cruciform shaft to the second cruciform shaft;
wherein the second cruciform shaft is a prism-shaped shaft that attaches the first cruciform shaft to the third cruciform shaft;
wherein the third cruciform shaft is a prism-shaped shaft that attaches the second cruciform shaft to the fourth cruciform shaft;
wherein the fourth cruciform shaft is a prism-shaped shaft that attaches the third cruciform shaft to the fifth cruciform shaft;
wherein the fifth cruciform shaft is a prism-shaped shaft that attaches the fourth cruciform shaft to the sixth cruciform shaft;
wherein the sixth cruciform shaft is a prism-shaped shaft that attaches the fifth cruciform shaft to the seventh cruciform shaft;
wherein the seventh cruciform shaft is a prism-shaped shaft that attaches the sixth cruciform shaft to the eighth cruciform shaft;
wherein the eighth cruciform shaft is a prism-shaped shaft that attaches the seventh cruciform shaft to the ninth cruciform shaft;
wherein the ninth cruciform shaft is a prism-shaped shaft that attaches the eighth cruciform shaft to the tenth cruciform shaft;
wherein the tenth cruciform shaft is a prism-shaped shaft that attaches the ninth cruciform shaft to the eleventh cruciform shaft;
wherein the eleventh cruciform shaft is a prism-shaped shaft that attaches the tenth cruciform shaft to the twelfth cruciform shaft;
wherein the twelfth cruciform shaft is a prism-shaped shaft that attaches the eleventh cruciform shaft to the first cruciform shaft;
wherein the first cruciform shaft is a rigid structure;
wherein the second cruciform shaft is a rigid structure;
wherein the third cruciform shaft is a rigid structure;
wherein the fourth cruciform shaft is a rigid structure;
wherein the fifth cruciform shaft is a rigid structure;
wherein the sixth cruciform shaft is a rigid structure;
wherein the seventh cruciform shaft is a rigid structure;
wherein the eighth cruciform shaft is a rigid structure;
wherein the ninth cruciform shaft is a rigid structure;
wherein the tenth cruciform shaft is a rigid structure;
wherein the eleventh cruciform shaft is a rigid structure;
wherein the twelfth cruciform shaft is a rigid structure.

9. The campfire rack according to claim 8
wherein the plurality of interior right angles comprises a first interior right angle, a second interior right angle, a third interior right angle, a fourth interior right angle, a fifth interior right angle, a sixth interior right angle, a seventh interior right angle, and an eighth interior right angle;
wherein the first cruciform shaft attaches to the second cruciform shaft to form called the first interior right angle;
wherein the second cruciform shaft attaches to the third cruciform shaft to form the second interior right angle;
wherein the fourth cruciform shaft attaches to the fifth cruciform shaft to form the third interior right angle;
wherein the fifth cruciform shaft attaches to the sixth cruciform shaft to form the fourth interior right angle;
wherein the seventh cruciform shaft attaches to the eighth cruciform shaft to form called the fifth interior right angle;
wherein the eighth cruciform shaft attaches to the ninth cruciform shaft to form the sixth interior right angle;
wherein the tenth cruciform shaft attaches to the eleventh cruciform shaft to form the seventh interior right angle;
wherein the eleventh cruciform shaft attaches to the twelfth cruciform shaft to form the eighth interior right angle.

10. The campfire rack according to claim 9
wherein the plurality of exterior right angles comprises a first exterior right angle, a second exterior right angle, a third exterior right angle, and a fourth exterior right angle;
wherein the twelfth cruciform shaft attaches to the first cruciform shaft to form the first exterior right angle;
wherein the third cruciform shaft attaches to the fourth cruciform shaft to form the second exterior right angle;
wherein the sixth cruciform shaft attaches to the seventh cruciform shaft to form the third exterior right angle;
wherein the ninth cruciform shaft attaches to the tenth cruciform shaft to form the fourth exterior right angle.

11. The campfire rack according to claim 10 wherein the first cruciform shaft, the second cruciform shaft, the third cruciform shaft, the fourth cruciform shaft, the fifth cruciform shaft, the sixth cruciform shaft, the seventh cruciform shaft, the eighth cruciform shaft, the ninth cruciform shaft, the tenth cruciform shaft, the eleventh cruciform shaft, and the twelfth cruciform shaft are assembled to form a planar cruciform structure.

12. The campfire rack according to claim 11
wherein the first leg shaft of the first leg structure attaches to the second interior right angle of the primary basin such that the first leg shaft projects away from the secondary basin such that the elevation of the primary basin is between the elevation of the center point of the first leg shaft and the elevation of the brace point of the secondary basin;
wherein the fifth leg shaft of the first leg structure attaches to the third interior right angle of the primary basin such that the fifth leg shaft projects away from the secondary basin such that the elevation of the primary basin is between the elevation of the center point of the fifth leg shaft and the elevation of the brace point of the secondary basin;
wherein the sixth leg shaft of the second leg structure attaches to the fourth interior right angle of the primary basin such that the sixth leg shaft projects away from the secondary basin such that the elevation of the primary basin is between the elevation of the center point of the sixth leg shaft and the elevation of the brace point of the secondary basin;
wherein the tenth leg shaft of the second leg structure attaches to the fifth interior right angle of the primary basin such that the tenth leg shaft projects away from the secondary basin such that the elevation of the primary basin is between the elevation of the center point of the tenth leg shaft and the elevation of the brace point of the secondary basin;
wherein the eleventh leg shaft of the third leg structure attaches to the sixth interior right angle of the primary basin such that the eleventh leg shaft projects away from the secondary basin such that the elevation of the primary basin is between the elevation of the center point of the eleventh leg shaft and the elevation of the brace point of the secondary basin;
wherein the fifteenth leg shaft of the third leg structure attaches to the seventh interior right angle of the primary basin such that the fifteenth leg shaft projects away from the secondary basin such that the elevation of the primary basin is between the elevation of the center point of the fifteenth leg shaft and the elevation of the brace point of the secondary basin;
wherein the sixteenth leg shaft of the fourth leg structure attaches to the eighth interior right angle of the primary basin such that the sixteenth leg shaft projects away from the secondary basin such that the elevation of the primary basin is between the elevation of the center point of the sixteenth leg shaft and the elevation of the brace point of the secondary basin;
wherein the twentieth leg shaft of the fourth leg structure attaches to the first interior right angle of the primary basin such that the twentieth leg shaft projects away from the secondary basin such that the elevation of the primary basin is between the elevation of the center point of the twentieth leg shaft and the elevation of the brace point of the secondary basin.

13. The campfire rack according to claim 12
wherein the secondary basin comprises a first brace structure, a second brace structure, a third brace structure, a fourth brace structure, and a brace point;
wherein the first brace structure, the second brace structure, the third brace structure, and the fourth brace structure join together to form the brace point;
wherein the first brace structure is a non-Euclidean composite prism;
wherein the first brace structure is formed with a cant;
wherein the second brace structure is a non-Euclidean composite prism;
wherein the second brace structure is formed with a cant;
wherein the third brace structure is a non-Euclidean composite prism;
wherein the third brace structure is formed with a cant;
wherein the fourth brace structure is a non-Euclidean composite prism;
wherein the fourth brace structure is formed with a cant;
wherein the first brace structure comprises a first brace shaft, and a second brace shaft;
wherein the first brace shaft is a prism-shaped shaft;
wherein the first brace shaft is a rigid structure;
wherein the second brace shaft is a prism-shaped shaft;
wherein the second brace shaft is a rigid structure;
wherein the second brace structure comprises a third brace shaft, and a fourth brace shaft;
wherein the third brace shaft is a prism-shaped shaft;
wherein the third brace shaft is a rigid structure;
wherein the fourth brace shaft is a prism-shaped shaft;
wherein the fourth brace shaft is a rigid structure;
wherein the third brace structure comprises a fifth brace shaft, and a sixth brace shaft;
wherein the fifth brace shaft is a prism-shaped shaft;
wherein the fifth brace shaft is a rigid structure;
wherein the sixth brace shaft is a prism-shaped shaft;
wherein the sixth brace shaft is a rigid structure;
wherein the fourth brace structure comprises a seventh brace shaft, and an eighth brace shaft;
wherein the seventh brace shaft is a prism-shaped shaft;
wherein the seventh brace shaft is a rigid structure;
wherein the eighth brace shaft is a prism-shaped shaft;
wherein the eighth brace shaft is a rigid structure.

14. The campfire rack according to claim 13
wherein the first brace structure attaches the third leg shaft to the brace point of the plurality of leg structures;
wherein an end of the first brace shaft attaches to the third leg shaft at the center point of the center axis of the third leg shaft;
wherein the end of the first brace shaft that is distal from the third leg shaft attaches to the end of the second brace shaft that is distal from the brace point of the plurality of leg structures;
wherein the end of the second brace shaft that is distal from the first brace shaft attaches to the brace point of the plurality of leg structures;
wherein the second brace structure attaches the eighth leg shaft to the brace point of the plurality of leg structures;
wherein an end of the third brace shaft attaches to the eighth leg shaft at the center point of the center axis of the eighth leg shaft;
wherein the end of the third brace shaft that is distal from the eighth leg shaft attaches to the end of the fourth brace shaft that is distal from the brace point of the plurality of leg structures;
wherein the end of the fourth brace shaft that is distal from the third brace shaft attaches to the brace point of the plurality of leg structures;
wherein the third brace structure attaches the thirteenth leg shaft to the brace point of the plurality of leg structures;
wherein an end of the fifth brace shaft attaches to the thirteenth leg shaft at the center point of the center axis of the thirteenth leg shaft;
wherein the end of the fifth brace shaft that is distal from the thirteenth leg shaft attaches to the end of the sixth brace shaft that is distal from the brace point of the plurality of leg structures;
wherein the end of the sixth brace shaft that is distal from the fifth brace shaft attaches to the brace point of the plurality of leg structures;
wherein the fourth brace structure attaches the eighteenth leg shaft to the brace point of the plurality of leg structures;
wherein an end of the seventh brace shaft attaches to the eighteenth leg shaft at the center point of the center axis of the eighteenth leg shaft;
wherein the end of the seventh brace shaft that is distal from the eighteenth leg shaft attaches to the end of the eighth brace shaft that is distal from the brace point of the plurality of leg structures;
wherein the end of the eighth brace shaft that is distal from the seventh brace shaft attaches to the brace point of the plurality of leg structures.

15. The campfire rack according to claim 14 wherein the third leg shaft, the eighth leg shaft, the thirteenth leg shaft, and the eighteenth leg shaft are placed on the supporting surface.

16. The campfire rack according to claim 14 wherein the joints formed by the: a) first leg shaft and the second leg shaft; b) the fourth leg shaft and the fifth leg shaft; c) the sixth leg shaft and the seventh leg shaft; d) the ninth leg shaft and the tenth leg shaft; e) the eleventh leg shaft and the twelfth leg shaft; f) the fourteenth leg shaft and the fifteenth leg shaft; g) the sixteenth leg shaft and the seventeenth leg shaft; and, h) the nineteenth leg shaft and the twentieth leg shaft are placed on the supporting surface.

* * * * *